Figure 1:
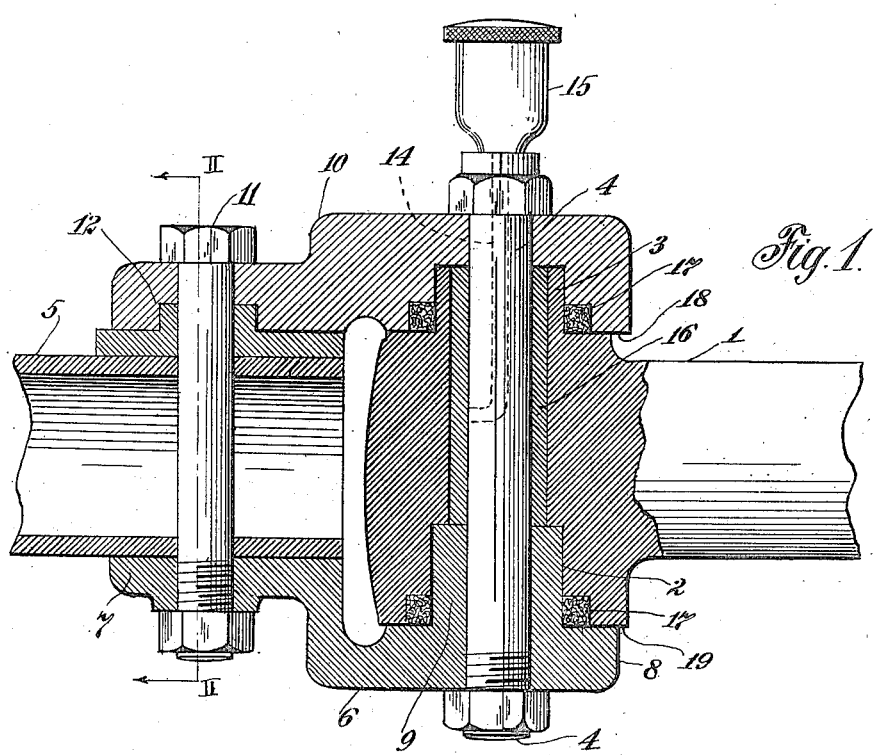

J. WALTERS.
STEERING KNUCKLE JOINT.
APPLICATION FILED APR. 11, 1917.

1,238,852.

Patented Sept. 4, 1917.

Witness
Charles Balg
G E McGrann

Inventor
James Walters.
By
Attorneys

UNITED STATES PATENT OFFICE.

JAMES WALTERS, OF CASS CITY, MICHIGAN.

STEERING-KNUCKLE JOINT.

1,238,852.  Specification of Letters Patent.  Patented Sept. 4, 1917.

Application filed April 11, 1917. Serial No. 161,108.

*To all whom it may concern:*

Be it known that I, JAMES WALTERS, a citizen of the United States of America, residing at Cass City, in the county of Tuscola and State of Michigan, have invented certain new and useful Improvements in Steering-Knuckle Joints, of which the following is a specification, reference being had therein to the accompanying drawings.

In the operation of automobiles it is extremely necessary that the parts controlling the steering mechanism be such as to resist wear and to provide resistance to road shocks and at the same time be dust proof and free from play so that they do not rattle.

This invention relates to a knuckle joint for the steering mechanism of automobiles and the arrangement thereof whereby perfect lubrication is afforded, whereby great strength is obtained with simplicity and lightness of construction and whereby both water and dirt are excluded from the bearing, the latter also being so arranged that it can be partially disrupted without permitting the parts to get out of alinement.

The invention consists in the matters hereinafter set forth, and more particularly pointed out in the appended claims.

Figure 2:
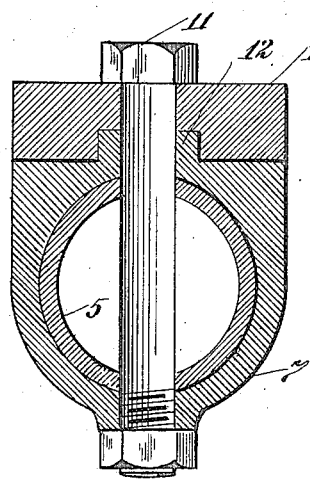

In the drawings,

Figure 1 is a view partially in longitudinal section and partially in elevation, and greatly enlarged, of a knuckle joint that embodies features of the invention, and Fig. 2 is a view in section taken on or about line II—II of Fig. 1.

As herein shown, a steering knuckle arm 1 has a suitably disposed and proportioned head 2 with an upper boss 3 concentric with a bearing opening for a stud 4, the lower portion of the opening being counterbored. A cross member 5 which is used to couple the steering knuckle arm 1 with the companion arm of the other wheel, is usually and preferably tubular.

A fitting 6 having a sleeve 7 that embraces the tube is arranged with a bracket 8 and bearing 9 thereon to receive the lower portion of the head 2. A cap 10 is secured on the fitting 6 by a bolt 11 that passes therethrough and through the member 5 so as to move the parts in position. To maintain the alinement as well as protect the joint, the cap 10 is recessed or counterbored where the bolt 11 passes therethrough to form a bearing seat for a boss 12 on the fitting and it is likewise recessed or counterbored to telescope over the upper extended portion 3 of the fitting 2.

The stud 4 has an oil groove 14 therethrough with oil cup 15, the oil passage delivering into the joint between the bolt and a bushing 16 that is interposed between it and the fitting 2 while dust washers 17 of suitable material, such as felt or the like, are seated in recesses around the upper portion of the sleeve 3 and the part 9 in such manner as to prevent moisture from entering the horizontal seams between the end faces of the head 2 and the fitting 6 with its cap 10.

As a result of this construction the member or knuckle arm 1 is coupled to the cross arm 5 in such manner that absolute alinement between the parts is maintained while the strain which tends to shear the stud 4 is met in a large degree both by the fitting and by its cap, the latter because of its engagement with the boss 12 and the part 3, holding the parts rigidly together even if the stud 4 gives way. Furthermore the cap is so disposed that its upper margin forms an overhang as indicated at 18 to prevent water that falls thereon from working into the joint between it and the fitting and similarly the body of the member 1 is enlarged as indicated at 19 to overhang the bracket 8 and likewise afford protection against the weather.

A feature of the invention is the rigid alinement maintained by the part without imposing any extra strain upon the pivot bolt, the fitting and the head interlocking so that the stud or pivot bolt may become loose or fractured without disturbance of the connection. Furthermore, the disposition of the joints is such that any water or dust is prevented from entering the main bearing parts while the wearing surfaces are so large as to minimize the possibility of excessive abrasion and consequent rattling of the joints.

A further feature is the perfect lubrication afforded which cannot be maintained effectively in a place of this nature in which dust is permitted to enter as it merely forms an abradent that quickly cuts away the bearing surfaces.

Obviously, changes in the details of construction may be made without departing from the spirit of my invention and I do not care to limit myself to any particular form or arrangement of parts.

What I claim is:—

1. A steering knuckle joint for automobiles, comprising a steering arm having a bearing head longitudinally apertured to receive a stud and counterbored at the lower portion, a cross arm, a fitting secured on the cross arm having a bracket adapted to engage into the counterbored recess of the head, a cap interlocking the upper portion of the fitting with the upper portion of the head, means for securing the cap in position on the cross arm, and a bearing stud passing through the cap, head and bracket.

2. A steering knuckle joint comprising a steering arm having a longitudinally apertured head recessed at the lower end and provided with an upwardly extending bearing boss, a cross arm, a fitting on the cross arm having a bracket on which the head is rotatably secured, the bracket entering the recessed portion thereof, the upper part of the fitting having a boss, a cap engaging over the boss and over the upper portion of the head, means for connecting the cap and fitting to the cross arm, and a bearing stud extending through the cap, head and bracket.

3. A steering knuckle joint comprising a steering arm having a longitudinally apertured head recessed at the lower end and provided with an upwardly extending bearing boss, a cross arm, a fitting on the cross arm having a bracket on which the head is rotatably secured, the bracket entering the recessed portion thereof, the upper part of the fitting having a boss, a cap engaging over the boss of the fitting and over the upper boss of the head, means for securing the cap and fitting to the cross arm, and a bearing stud extending through the cap, head and bracket, the cap overhanging the head and the head overhanging the bracket together with dust proof members interposed in the bearing joints.

4. A steering knuckle for automobiles comprising the combination of a steering arm and cross arm of a fitting secured on the cross arm and provided with a laterally extending bracket, the steering arm having a head journaled on the bracket, a cap interlocked with the fitting on which the head is journaled, the head overhanging the bracket and the cap overhanging the head, dust washers sealing the end joints between the bracket and contiguous parts and a bearing stud in the cap and bracket on which the steering arm head is journaled.

5. A steering knuckle joint comprising a steering knuckle arm, a cross arm, a fitting on the cross arm, a recessed cap detachably secured on the fitting and said arm having a head journaled in and between the cap and the fitting with the upper portion thereof extending upwardly into the recess of the cap and the lower portion thereof journaled on an upwardly extending portion of the fitting, a bolt extending through the cap and fitting and cross arm and a bearing stud in the cap and fitting on which the head turns.

In testimony whereof I affix my signature in the presence of two witnesses.

JAMES WALTERS.

Witnesses:
J. C. CORKINS,
S. A. RUMBLE.

Copies of this patent may be obtained for five cents each, by addressing the "Commissioner of Patents, Washington, D. C."